US008239756B2

(12) United States Patent
Maes et al.

(10) Patent No.: US 8,239,756 B2
(45) Date of Patent: Aug. 7, 2012

(54) INTELLIGENT DOCUMENT FILTERING

(75) Inventors: Stephane Herman Maes, Danbury, CT (US); Thiruvilwamalai V. Raman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1031 days.

(21) Appl. No.: 12/189,488

(22) Filed: Aug. 11, 2008

(65) Prior Publication Data
US 2008/0301543 A1    Dec. 4, 2008

Related U.S. Application Data

(63) Continuation of application No. 09/811,966, filed on Mar. 19, 2001, now Pat. No. 7,415,538.

(51) Int. Cl.
*G06F 17/26* (2006.01)
*G06F 17/27* (2006.01)

(52) U.S. Cl. ............... 715/234; 715/239; 715/249

(58) Field of Classification Search .............. 715/234, 715/239, 249
See application file for complete search history.

(56) References Cited

U.S. PATENT DOCUMENTS

| | | | | |
|---|---|---|---|---|
| 5,950,123 A * | 9/1999 | Schwelb et al. | ........... | 455/414.4 |
| 6,092,091 A * | 7/2000 | Sumita et al. | ................ | 715/209 |
| 6,240,392 B1 * | 5/2001 | Butnaru et al. | ............... | 704/271 |
| 6,311,187 B1 * | 10/2001 | Jeyaraman | .................... | 707/770 |
| 6,418,446 B1 * | 7/2002 | Lection et al. | ........................ | 1/1 |
| 6,725,424 B1 * | 4/2004 | Schwerdtfeger et al. | ..... | 715/239 |
| 7,500,188 B1 * | 3/2009 | Trapani et al. | ................ | 715/273 |
| 7,523,158 B1 * | 4/2009 | Nickerson et al. | ............ | 709/203 |
| 2002/0004813 A1 * | 1/2002 | Agrawal et al. | ............... | 709/201 |
| 2002/0049788 A1 * | 4/2002 | Lipkin et al. | .................. | 707/513 |
| 2002/0165870 A1 * | 11/2002 | Chakraborty et al. | ........ | 707/206 |
| 2002/0174147 A1 * | 11/2002 | Wang et al. | ................... | 707/513 |
| 2003/0208473 A1 * | 11/2003 | Lennon | ............................ | 707/3 |

OTHER PUBLICATIONS

Yu et al., "Improving Pseudo-Relevance Feedback in Web Information Retrieval Using Web Page Segmentation" ACM, 2003, pp. 11-18.*
Lim et al., "Access Control of XML Documents Considering Update Operations", ACM, 2003, pp. 49-59.*

* cited by examiner

*Primary Examiner* — Doug Hutton, Jr.
*Assistant Examiner* — James Debrow
(74) *Attorney, Agent, or Firm* — F. Chau & Associates, LLC; Anne V. Dougherty, Esq.

(57) ABSTRACT

In a network environment that includes a plurality of nodes and that uses a markup language to create documents, a method for filtering the documents is provided. The method includes the step of, upon receiving a request from a requesting node among the plurality of nodes, constructing an input Document Object Model (DOM) based on a document corresponding to the request. The input DOM is stored. Elements of the input DOM that have previously been stored are identified. The input DOM is filtered to obtain a filtered DOM, based on at least one pre-specified rule being applied to the input DOM.

24 Claims, 3 Drawing Sheets

INTELLIGENT DOCUMENT FILTERING

CROSS REFERENCE TO RELATED UNITED STATES APPLICATIONS

This application is a continuation of, and claims priority from, U.S. patent application Ser. No. 09/811,966, filed on Mar. 19, 2001 now U.S. Pat. No. 7,415,538 of Stephane Herman Maes, the contents of which are incorporated herein in their entirety.

BACKGROUND OF THE INVENTION

1. Technical Field

The present invention relates generally to document filtering and, in particular, to a method and system for filtering documents in a client/server environment with respect to new and/or relevant content.

2. Description of Related Art

Currently, major World Wide Web (WWW) sites create complex user interfaces using HyperText Markup Language (HTML). Consequently, the resulting HTML pages contain substantial amounts of presentational markup. Further, this presentational markup is repeated across all pages on the site. As an example, all pages served by CNN.com provide a common "look and feel" by including HTML markup that sets up a standard toolbar, menubar, and other Graphical User Interface (GUI) widgets.

Another consequence of using HTML to create complex user interfaces is that the amount of new content in each page downloaded from the same web site represents only a small fraction of the actual page. The inclusion of substantial presentational markup prevents devices with small screens from displaying most of the information contained on a web page.

Thus, in addition to the problems described above, the use of HTML to create complex user interfaces results in further problems and/or obstacles. For example, devices having low bandwidth require a long time to download complex pages. Additionally, low powered devices spend unnecessary computational cycles processing and displaying the same pieces of markup. Further, devices with limited display real estate are forced to display "heavyweight" GUI. Moreover, users with special needs, e.g., visually impaired users, have a difficult time picking out the relevant content in the displayed page.

Accordingly, it would be desirable and highly advantageous to have a method and system for filtering documents in a client/server environment so that only new and/or relevant content is delivered to a client.

SUMMARY OF THE INVENTION

The problems stated above, as well as other related problems of the prior art, are solved by the present invention, a method and system for filtering documents in a client/server environment. The method and system filters the documents so that only new and/or relevant content is provided to a client.

According to an aspect of the invention, in a network environment that includes a plurality of nodes and that uses a markup language to create documents, a method for filtering the documents is provided. The method includes the step of, upon receiving a request from a requesting node among the plurality of nodes, constructing an input Document Object Model (DOM) based on a document corresponding to the request. The input DOM is stored. Elements of the input DOM that have previously been stored are identified. The input DOM is filtered to obtain a filtered DOM, based on at least one pre-specified rule being applied to the input DOM.

According to another aspect of the invention, a system for filtering markup language documents in a client/server environment having at least one client device and at least one server is provided. The system includes an intermediary operatively coupled between the at least one client device and the at least one server, adapted to receive a request sent from the at least one client device or from another intermediary, and to receive a document corresponding to the request. A filter operatively coupled to the intermediary, is adapted to build an input document object model (DOM) based on the document, and to filter the input DOM to output a filtered DOM based on at least one pre-specified rule being applied to the input DOM. A differential DOM coder operatively coupled to at least one of the at least one client device and the intermediary, is adapted to receive the filtered DOM and to identify and to output at least changed data with respect to the input DOM and the filtered DOM.

According to yet another aspect of the invention, a system for filtering markup language documents in a client/server environment having at least one client device and at least one server is provided. The system includes an intermediary operatively coupled between the at least one client device and the at least one server, adapted to receive a request from the at least one client device or another intermediary, receive a document corresponding to the request, and to output a filtered document object model (DOM) to the at least one client device or the other intermediary. A storage device operatively coupled to said intermediary, is adapted to store an input DOM, and to identify elements of the input DOM that have previously been stored. A filter operatively coupled to said storage device and said intermediary or the other intermediary, is adapted to build the input DOM based on the document, and to filter the input DOM to obtain the filtered DOM based on at least one pre-specified rule being applied to at least one of the input DOM and the identified elements.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
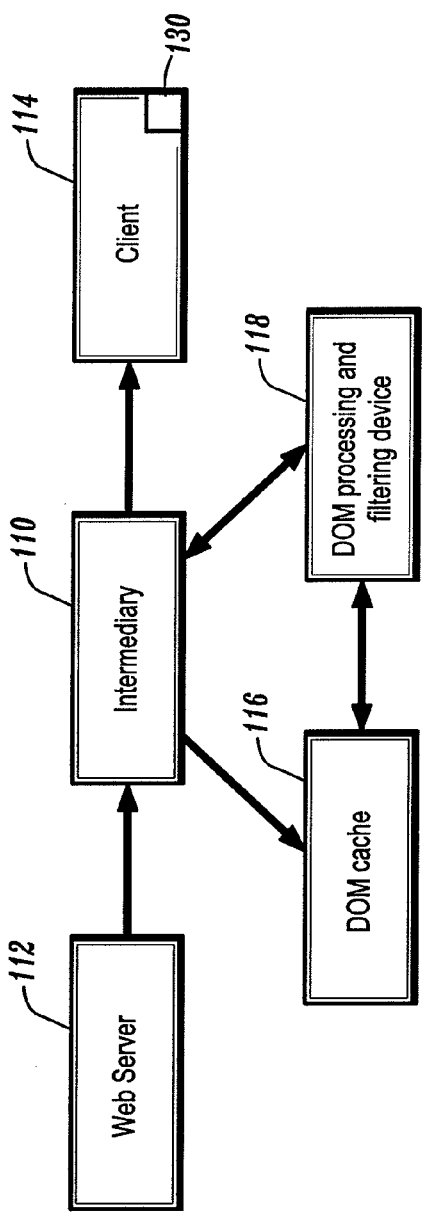
FIG. 1 is a block diagram illustrating a client/server environment to which the present invention may be applied, according to an illustrative embodiment thereof.

The present invention is directed to a method and system for filtering documents in a client/server environment. The method and system filters the documents so that only new and/or relevant content is provided to a client. It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform may also include an operating system and/or micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

A general description of the present invention will now be provided to introduce the reader to the concepts of the invention. Subsequently, more detailed descriptions of various aspects of the invention will be provided with respect to FIGS. 1 through 4.

The present invention provides intelligent document filtering by introducing an intelligent intermediary that preprocesses, caches and filters pages before they are served to the client device (hereinafter also referred to as the "client"). It is to be appreciated that the intelligent intermediary may also be located on the client side. Given the teachings of the present invention provided herein, one of ordinary skill in the related art will contemplate these and various other configurations and arrangements of the elements of the invention.

Input documents are filtered by constructing a Document Object Model (DOM) and serving to the client only nodes that contain updated content. DOM is further described at http://www.w3.org/TR/DOM-Level-2-Core. According to an illustrative embodiment of the invention, the HyperText Transfer Protocol (HTTP) message carrying the results of filtering is identified with an HTTP extension header of:
x-dom-filtered-against: url,
where "url" identifies the root document against which the present document was filtered. This can be understood as a differential DOM Coder/filter. It is to be appreciated that other identifiers may be used to identify the present (filtered) document and/or the root document against which the present document was filtered, while maintaining the spirit and scope of the invention. For example, the transport layer (WSP) for Wireless Application Protocol (WAP) can be used in place of the HTTP extension header described above.

Upon receipt of the HTTP message containing the results of filtering, clients can choose to do one of many things based on user preference and choice. For example, in a first embodiment, the page is displayed along with the GUI. To this end, the new document is received, a DOM is constructed, and this DOM is further processed to identify those nodes that have changed relative to the previous (or root) document. Finally, only the updated nodes are communicated to downstream systems that consequently update their own DOM with these changed nodes to produce the result of receiving the entire updated document. This provides a full GUI experience while saving bandwidth. In a second embodiment, only the results of filtering are displayed, along with a button that when clicked brings up the full GUI. In a third embodiment, only the updated content is rendered via a time-sensitive modality such as, for example, speech. It is to be appreciated that the preceding three embodiments are merely illustrative and, thus, other uses of the results of filtering may be employed while maintaining the spirit and scope of the invention.

According to preferred embodiments of the invention, the server intermediary can advantageously learn as multiple users (of one or more client devices) browse to deliver a richer user experience. The service provider can also teach the intermediary about how to best filter popular sites for viewing on specific client devices. These features are described in further detail hereinbelow.

FIG. 1 is a block diagram illustrating a client/server environment to which the present invention may be applied, according to an illustrative embodiment thereof. A smart intermediary 110 is operatively coupled to a web server 112, a client 114, a Document Object Model (DOM) cache 116 (hereinafter "cache"), and a DOM processing and filtering device 118 (hereinafter "filtering device"). The client 114 optionally includes a speech synthesis system 130. It is to be appreciated that while only one each of the preceding elements is shown in FIG. 1, other embodiments of the invention may include more than one of any or all of the preceding elements, while maintaining the spirit and scope of the invention. Moreover, it is to be further appreciated that some of the elements shown in FIG. 1 may be replaced by other elements which perform a similar function. For example, the cache 116 may be replaced by another storage medium such as a hard disk drive. Given the teachings of the invention provided herein, one of ordinary skill in the related art will contemplate these and various other implementations of the elements of the present invention, while maintaining the spirit and scope thereof.

The Document Object Model (DOM), as specified by the World Wide Web Consortium (W3C), is a vendor-neutral representation of World Wide Web (WWW) documents that can be used to represent, manipulate and deliver interactive WWW content to WWW user agents in a vendor-neutral form.

The smart intermediary 110 intercepts documents on their way from the web server 112 to the client 114 to set up the filtering process.

The filtering device 118 accepts an input DOM, applies selective filtering rules, and outputs a DOM (hereinafter also referred to as a "filtered DOM") that represents the results of filtering.

Serializers, which are preferably included in filtering device 118, accept a DOM representation and write out an appropriate HTML representation for the input DOM, where such serialized output is customized for the receiving user agent. With the advent of mobile devices and voice browsers, such serializers may output Voice extensible Markup Language (VoiceXML) for consumption by voice browsers or Wireless Markup Language (WML) for consumption by wireless application protocol (WAP) devices. In such cases, the serializers can also accept VoiceXML DOM or WML DOM as input. Thus, the present invention is not limited to HTML DOM inputs.

The cache 116 holds the results of prior processing and may be used for optimizing bandwidth consumption. The cache 116 is also used to track the history of user interaction, e.g., what pages have been visited during a given session—to positively influence the filtering process and eliminate content that has already been seen by the user.

A brief description of some of the many features, applications, and advantages of the invention will now be given.

The invention enables only new content to be delivered to the client 114. The receipt of only new content preserves the limited resources of many devices (e.g., bandwidth, memory, processing ability, and/or display screen area, below a predefined threshold), spares the user from having to determine which portions of the content are new, enables the user to more quickly receive data (since the overall amount of data is reduced), and so forth.

Moreover, the invention enables only relevant content to be delivered to the client 114. The receipt of only relevant content allows the user to see more information of pertinence to the user, as opposed to such information being clouded by presentational or previously seen non-relevant information. This is particularly useful in the case of hand-held devices having small displays or for people with a visual or hearing impairment. It is to be appreciated that the invention determines the relevance of data by "learning" the data that changes over a series of interactions and presuming that only this data is relevant.

It is to be further appreciated that many of the advantages of delivering only new content to a user also apply to the case of delivering only relevant content to the user. For example, the removal of non-relevant content preserves the limited resources of many devices (e.g., bandwidth, memory, processing ability) and enables the user to more quickly receive data (since the overall amount of data is reduced).

In a preferred embodiment of the invention, the intermediary 110 is constructed using one or more Web Intermediaries (WBIs) provided by International Business Machines Corp. (IBM). The WBIs can be used to construct smart intermediary proxies. The Document Object Model (DOM) filtering approach described below is capable of being plugged into the WBI framework. It is to be appreciated that while a preferred embodiment of the invention is directed to the use of WBI, the invention is not so limited and, thus, embodiments of the invention that are independent of the WBI framework are also possible. WBIs are further described at http://www.research.ibm.com/journals/sj/384/barrett.html.

Given the teachings of the invention provided herein, one of ordinary skill in related art will contemplate these and various other advantages, applications, and features of the invention, which maintaining the spirit and scope thereof.

A brief description of some of the many possible extensions of the invention will now be given. It is to be appreciated that the invention is not limited to HTML. Instead, the invention can be extended to any XML (or other markup language) application for which an appropriate DOM convention has been provided. Also, HTTP extensions of the protocols can be trivially extended to other protocols (e.g., WAP) to achieve the same functionalities. When a DOM specification does not exist (e.g., currently there is no DOM specification for VoiceXML), it is possible to use a proprietary or pseudo DOM that essentially fulfills the characteristics of an XML DOM. Thus, the approach described herein can advantageously be employed with any such XML applications.

Figure 2:
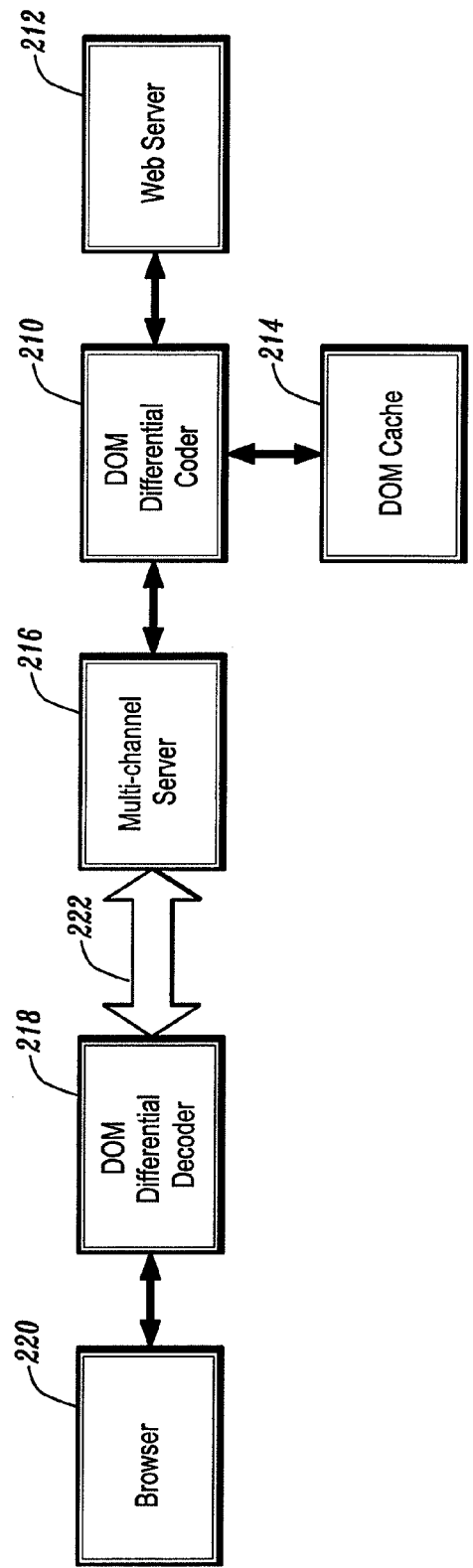
FIG. 2 is a block diagram illustrating a client/server environment to which the present invention may be applied, according to another illustrative embodiment thereof.

It is to be further appreciated that the invention is not limited to server side DOM filtering to send relevant and/or new information to constrained devices or to reduce/optimize the HTTP traffic. FIG. 2 is a block diagram illustrating a client/server environment to which the present invention may be applied, according to another illustrative embodiment thereof. On the server side, there is a DOM differential coder 210 operatively coupled to a web server 212, a DOM cache 214, and a multi-channel server 216. On the client side, there is a DOM differential decoder 218 operatively coupled to a browser 220. The DOM differential decoder 218 is also operatively coupled to the multi-channel server 216 through a network 222 (e.g., the Web).

Moreover, since the approach can be extended to any XML application, the invention may also encompass multi-modal and conversational applications. For example, in conversational/speech applications, a significant amount of the menus remain active throughout a dialog. This can be achieved in VoiceXML via scoping variables or by repeating the menu on each page. When this second approach is used, DOM filtering according to the invention would differentially code the page. In conversational/multi-modal applications, combinations of both of the above examples can be implemented to encompass multiple authoring (i.e. synchronized HTML and VoiceXML) or single authoring (Conversational Markup Language (CML)). Consider, for example, conversational/speech cases, where a significant amount of the menus remain active throughout a dialog. This can be achieved in VoiceXML via variable scoping or by repeating the menus on each page. When the latter of the two preceding approaches is used, the DOM filtering can differentially code these menus. The same approach may be employed for multi-modal applications, where menus can be offered across pages in one or multiple modalities, authored by synchronizing different modality specific pages (see, e.g., PCT/US99/23008, entitled "Conversational Browser and Conversational System", filed on Oct. 1, 1999, assigned commonly herewith, the disclosure of which is incorporated by reference herein) or a common language (see, e.g., U.S. Ser. No. 09/544,823, entitled Methods and Systems for Multi-Modal Browsing and Implementation of a Conversational Markup Language, filed on Oct. 12, 1999, assigned commonly herewith, the disclosure of which is incorporated by reference herein). In this latter case, the filtering is performed before transforming the CML page into the different final target synchronized pages. Similarly in multi-channel cases (see, e.g.: U.S. Ser. No. 09/544,823, reference hereinabove; and U.S. Ser. No. 09/545,078, entitled A Conversational Portal for Providing Conversational Browsing and Multimedia Broadcast on Demand, filed on Apr. 7, 2000, assigned commonly herewith, the disclosure of which is incorporated by reference herein) the pages can be DOM filtered in a channel/modality independent manner prior to being served to a browser in a given access channel(s). Thus, it is to be appreciated that by generalizing the preceding observation, the DOM filtering operation can be performed prior to reaching the network edge server/gateway. In particular, the DOM filtering can be done when transcoding a generic XML page or prior to transcoding the page. The DOM filtering can be done prior to, during, and after any web intermediary that affects/transforms an XML document. The manipulation of the DOM itself can be more complex than filtering and differential coding as long that the DOM contributes to extracting only the relevant information from an XML document to prepare the XML document for a client based on the characteristics of what the browser can use or on the basis of what the browser received in the past within previous pages. As such, the DOM manipulation can also be a process that occurs between client and server as well as between web intermediaries along a chain of intermediaries that process XML pages.

Upon one of ordinary skill in the related art considering the present invention as a differential DOM coder, it will be readily apparent that the invention can also be used to compress caches (server caches and/or client browser caches). For example, the present invention may be used to compress caches by storing only the differences between a sequence of documents.

Figure 3:
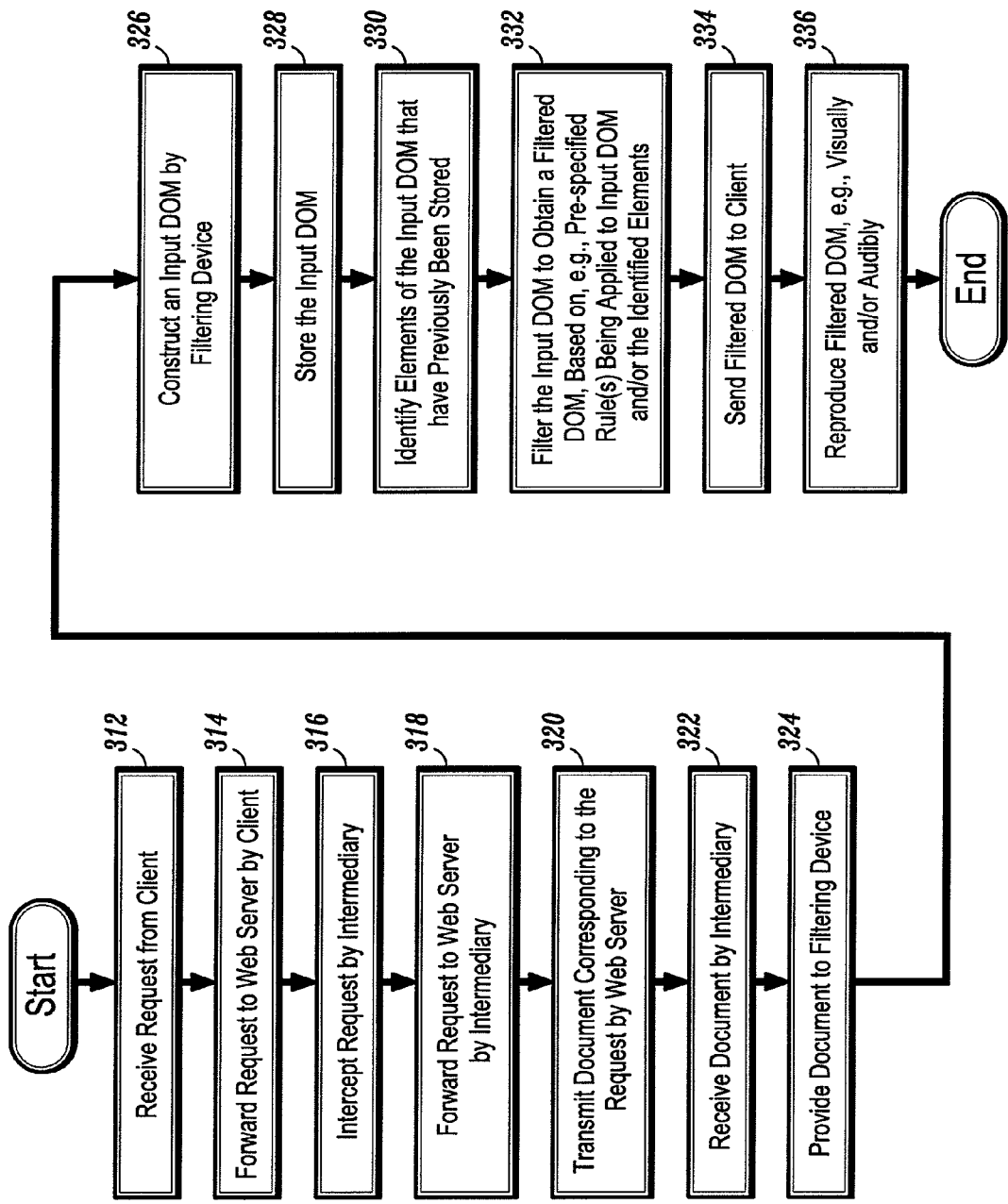
FIG. 3 is a flow diagram illustrating a method for filtering documents in a client/server environment, according to an illustrative embodiment of the invention.

FIG. 3 is a flow diagram illustrating a method for filtering documents in a client/server environment, according to an illustrative embodiment of the invention. The documents are written in a markup language such as, but not limited to, HTML and XML.

A request is received from the client 114 (step 312), and forwarded to the web server 112 (step 314). The request is intercepted by the intermediary 110 (step 316), and forwarded to the web server 112 by the intermediary 110 (step 318). The web server responds to the request by transmitting a document corresponding to the request (step 320). The intermediary 110 receives the document corresponding to the request (step 322) and provides the document to the filtering device 118 (step 324). The filtering device 118 constructs an input DOM based on the document (step 326).

The input DOM is then stored (e.g., cached in the cache 116) (step 328). Elements of the input DOM that have previously been stored (cached) are identified (step 330).

The input DOM is filtered by the filtering device 118 to obtain a filtered DOM, based on, e.g., at least one pre-specified rule being applied to the input DOM and/or the elements identified at step 330 (step 332). The filtered DOM is then sent to the client 114 (step 334). The filtered DOM may then be reproduced by the client 114, for example, visually (e.g., on a display), audibly (e.g., via the speech synthesis system 130), or a combination thereof (step 336).

Figure 4:
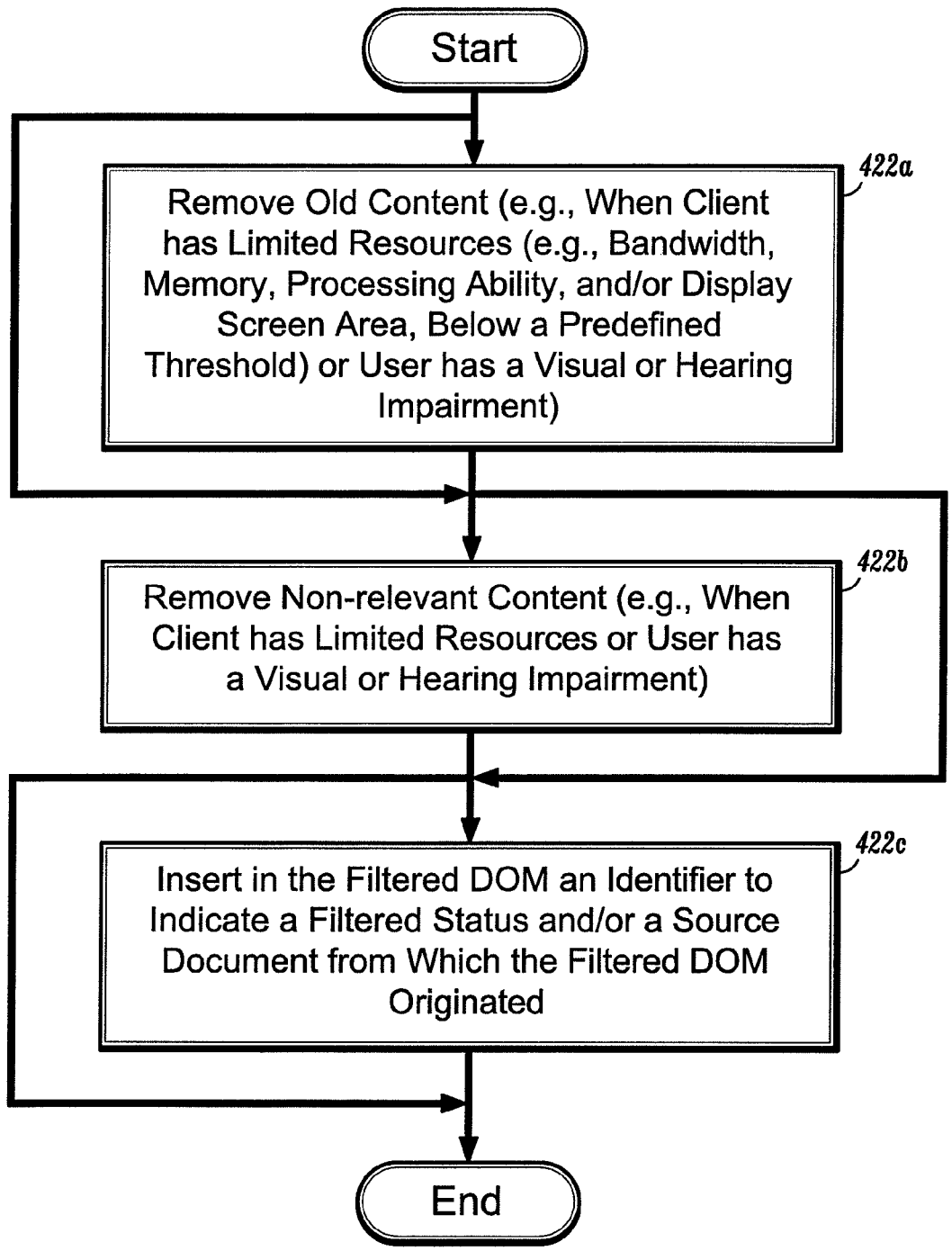
FIG. 4 is a flow diagram further illustrating step 332 of the method of FIG. 3, according to an illustrative embodiment of the invention.

FIG. 4 is a flow diagram further illustrating step 332 of the method of FIG. 3, according to an illustrative embodiment of the invention.

Old (previously received) content is removed (filtered out) (step 422a). Step 422a may be performed, for example, when the client 114 has limited resources (e.g., limited bandwidth, memory, processing ability, display screen area, etc.), or when the user of the client 114 has a visual or hearing impairment.

Non-relevant content (with respect to the request or as determined over at least one previous request/exchange) is removed (step 422b). Step 422b may be performed, for example, when the client 114 has limited resources (e.g., limited bandwidth, memory, processing ability, display screen area, etc.), or when the user of the client 114 has a visual or hearing impairment.

An identifier(s) is inserted in the filtered DOM, e.g., to indicate a filter status and/or a source document from which the filtered DOM originated (step 422c).

It is to be appreciated that one or both of steps 422a and 422b may be performed, depending on the particular implementation of the present invention. Moreover, it is to be appreciated that step 422c may be omitted, depending on the particular implementation of the present invention.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. In a network environment that includes a plurality of nodes and that uses a markup language to create documents, a method for filtering the documents, comprising the steps of:

upon receiving a request from a requesting node among the plurality of nodes, constructing an input Document Object Model (DOM) based on a document corresponding to the request storing the input DOM;

identifying elements of the input DOM that have previously been stored; and filtering the input DOM one of prior to, during, and after transcoding at least one page corresponding to the input DOM to obtain a filtered DOM, based on at least one pre-specified rule being applied to at least one of the input DOM and the identified elements;

wherein the at least one page comprises at least one XML page and said input DOM is filtered prior to transcoding the at least one XML page to at least one target presentation page in a multi-channel application or prior to transcoding the at least one XML page to at least one synchronized page in a multi-modal mode;

wherein the at least one pre-specified rule comprises removing previously received content from the input DOM, when a user of a client device is one of seeing and hearing impaired.

2. The method according to claim 1, further comprising a step of sending the filtered DOM to the requesting node.

3. The method according to claim 1, wherein said filtering step filters out previously received content from the input DOM based upon the identified elements.

4. The method according to claim 1, wherein said filtering step filters out content from the filtered DOM with respect to at least one of the request and at least one previous request.

5. The method according to claim 1, wherein said method further comprises a step of identifying changed data with respect to at least two interactions between the requesting node and another node from among the plurality of nodes.

6. The method according to claim 5, wherein said filtering step comprises a step of including only the changed data in the filtered DOM.

7. The method according to claim 1, wherein the at least one pre-specified rule comprises removing previously received content from the input DOM, when a client device has at least one pre-specified limited resource.

8. The method according to claim 7, wherein the at least one pre-specified limited resource comprises at least one of a bandwidth, a memory capacity, a processing ability, and a display screen area, less than a pre-defined threshold.

9. The method according to claim 1, wherein the at least one pre-specified rule comprises removing content from the input DOM when a client device has at least one pre-specified limited resource.

10. The method according to claim 1, further comprising a step of inserting a first identifier in the filtered DOM to identify said filtered DOM.

11. The method according to claim 10, further comprising a step of inserting a second identifier in the filtered DOM to indicate a source document from which the filtered DOM originated.

12. The method according to claim 11, wherein the first identifier and the second identifiers are comprised in a HyperText Transfer Protocol (HTTP) extension header.

13. The method according to claim 11, wherein the first identifier and the second identifiers are comprised in a transport layer for Wireless Application Protocol (WAP).

14. The method according to claim 11, wherein the second identifier is a Uniform Resource Locator (URL) specifying a location of the source document.

15. The method according to claim 1, wherein said filtering step comprises a step of removing presentational markup from the DOM.

16. The method according to claim 1, wherein said storing step stores the input DOM in a cache, and said identifying step identifies the elements of the input DOM that have previously been cached.

17. The method according to claim 1, wherein said method is implemented by a program storage device readable by machine, tangibly embodying a program of instructions executable by the machine to perform said method steps.

18. The method according to claim 1, wherein the markup language is eXtensible Markup Language (XML) and the input DOM and filtered DOM are pseudo DOMs.

19. The method according to claim 1, wherein the network environment is a client/server environment, the plurality of nodes includes a client device, and the requesting node is the client device.

20. The method according to claim 1, wherein the network environment is a client/server environment, the plurality of nodes includes at least one client device, at least one server, and at least one intermediary coupled therebetween, and the requesting node is an intermediary.

21. The method according to claim 1, wherein the network environment is a client/server environment, the plurality of nodes includes at least one client device and at least one server, the requesting node is a client device and the other node is the at least one server.

22. The method according to claim 1, wherein the network environment is a client/server environment, the plurality of nodes includes at least one client device, at least one server, and at least one intermediary coupled therebetween, the requesting node is a client device or an intermediary and the other node is a server or another intermediary.

23. The method according to claim 1, wherein the network environment is a client/server environment, the plurality of nodes includes a client device, and said filtering step is performed by the client device.

24. The method according to claim 1, wherein the network environment is a client/server environment, the plurality of nodes includes at least one client device, at least one server, and at least one intermediary coupled therebetween, and said filtering step is performed by the at least one intermediary.

* * * * *